(12) United States Patent
Wagh et al.

(10) Patent No.: US 7,438,755 B2
(45) Date of Patent: Oct. 21, 2008

(54) CHEMICALLY BONDED PHOSPHATE CERAMIC SEALANT FORMULATIONS FOR OIL FIELD APPLICATIONS

(75) Inventors: Arun S. Wagh, Naperville, IL (US); Seung-Young Jeong, Taejon (KR); Richard McDaniel, Crest Hill, IL (US)

(73) Assignee: UChicago Argonne, LLC, Chicago, IL (US)

( * ) Notice: Subject to any disclaimer, the term of this patent is extended or adjusted under 35 U.S.C. 154(b) by 328 days.

(21) Appl. No.: 11/212,087

(22) Filed: Aug. 24, 2005

(65) Prior Publication Data

US 2006/0048682 A1    Mar. 9, 2006

Related U.S. Application Data

(60) Provisional application No. 60/607,123, filed on Sep. 3, 2004.

(51) Int. Cl.
*C04B 12/02* (2006.01)
(52) U.S. Cl. ...................... 106/690; 106/691
(58) Field of Classification Search ............. 106/690, 106/691
See application file for complete search history.

(56) References Cited

U.S. PATENT DOCUMENTS

| 4,083,406 A | 4/1978 | Metz |
| 4,786,328 A | 11/1988 | Weill et al. |
| 5,311,945 A | 5/1994 | Cowan et al. |
| 5,351,759 A | 10/1994 | Nahm et al. |
| 5,900,053 A | 5/1999 | Brothers et al. |
| 6,136,088 A * | 10/2000 | Farrington .................. 106/691 |
| 6,561,269 B1 * | 5/2003 | Brown et al. ................ 166/77.1 |
| 7,160,383 B2 * | 1/2007 | Wagh et al. .................. 106/691 |

\* cited by examiner

*Primary Examiner*—Elizabeth D Wood
(74) *Attorney, Agent, or Firm*—Olson & Cepuritis, Ltd.

(57) ABSTRACT

A sealant for an oil or geothermal well capable of setting within about 3 to about 6 hours at temperatures less than about 250° F. for shallow wells less than about 10,000 feet and deep wells greater than about 10,000 feet having MgO present in the range of from about 9.9 to about 14.5%, $KH_2PO_4$ present in the range of from about 29.7 to about 27.2%, class C fly ash present in the range of from about 19.8 to about 36.3%, class F fly ash present in the range of from about 19.8 to about 0%, boric acid or borax present in the range of from about 0.39 to about 1.45%, and water present in the range of from about 20.3 to about 21.86% by weight of the sealant.

A method of sealing wells is disclosed as are compositions for very high temperature wells is disclosed as is a composition for treating oil field wastes.

16 Claims, 3 Drawing Sheets

CHEMICALLY BONDED PHOSPHATE CERAMIC SEALANT FORMULATIONS FOR OIL FIELD APPLICATIONS

RELATED APPLICATIONS

This application, pursuant to 37 C.F.R. § 1.78(c), claims priority based on provisional application Ser. No. 60/607,123 filed Sep. 3, 2004.

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to a number of chemically bonded phosphate ceramic (CBPC) formulations for specific oil field and geothermal well applications. Specific formulations are given for sealing shallow wells, i.e., down to about 10,000 feet, deep wells, those deeper that 10,000 feet, down-hole sealants for use off-shore where the availability of fresh water is limited and salt water is substituted. Also disclosed are formulations for light and heavy weight cements. Other formulations disclosed include a sealant based on aluminum phosphate for application in wells, including geothermal wells, which have temperatures greater that 300° F. and another ceramic based on calcium phosphate which may be used to prepare value-added products using drilling wastes.

In earlier inventions, Argonne National Laboratory (ANL) disclosed several chemically bonded phosphate ceramic (CBPC) binders, and Ceramicrete® formulation (CBPC formed by blend of MgO and $KH_2PO_4$ reacted with water) in particular, for applications in radioactive and hazardous waste management, structural materials, and also dental applications. Most of these applications are based on the fact that these rapid-setting phosphate ceramics exhibit superior properties compared to conventional cements. This observation also led the inventors to develop formulations of these materials for oil field applications, specifically, the invented formulations to deep and shallow wells and to lower and higher temperatures and pressures.

Additionally, the inventors have developed novel formulations, one based on aluminum phosphate and the other based on calcium phosphate, the former for use in geothermal wells and the latter for developing value-added products using drilling wastes.

SUMMARY OF THE INVENTION

An object of the present invention is to provide a binder or sealant for shallow and deep oil and gas wells, at high and low pressures and temperatures from ambient to over 250° F. and in either fresh or salt water environments.

Another object of the invention is to provide a sealant for an oil or geothermal well capable of setting within about 3 to about 6 hours at temperatures less than about 250° F. for shallow wells less than about 10,000 feet and deep wells greater than about 10,000 feet, the sealant being comprised of:

a) MgO present in the range of from about 9.9 to about 14.5% by weight of the sealant, b) $KH_2PO_4$ present in the range of from about 29.7 to about 27.2% by weight of the sealant, c) class C fly ash present in the range of from about 19.8 to about 36.3% by weight of the sealant, d) class F fly ash present in the range of from about 19.8 to about 0% by weight of the sealant, e) boric acid or borax present in the range of from about 0.39 to about 1.45% by weight of the sealant, and f) water present in the range of from about 20.3 to about 21.86% by weight of the sealant.

A further object of the invention is to provide a sealant for an oil or geothermal well capable of setting within about 3 to about 6 hours at temperatures greater than 250° F., comprising a) $Al_2O_3$ present in the range of from about 55 to about 57% by weight of the sealant, b) $Al(OH)_3$ present in the range of from about 3.5 to about 5% by weight of the sealant, c) $H_3PO_4$ present in the range of from about 15 to about 16% by weight of the sealant, d) boric acid or borax up to about 1.1% by weight of the sealant, and e) water present in the range of from about 23 to about 27% by weight of the sealant.

Yet another object of the invention is to provide a method of sealing a shallow or deep well at temperatures of less than about 250° F. with a compound that sets within about 3 to about 6 hours, comprising introducing into the well sufficient quantities of an aqueous slurry of: a) MgO present in the range of from about 9.9 to about 14.5% by weight of the sealant, b) $KH_2PO_4$ present in the range of from about 29.7 to about 27.2% by weight of the sealant, c) class C fly ash present in the range of from about 19.8 to about 36.3% by weight of the sealant, d) class F fly ash present in the range of from about 19.8 to about 0% by weight of the sealant, e) boric acid or borax present in the range of from about 0.39 to about 1.45% by weight of the sealant, and f) water present in the range of from about 20.3 to about 21.86% by weight of the sealant, the constituents of the slurry being adjusted for well temperature and pressure and the presence or absence of salt water and the desired setting time.

A further object of the present invention is to provide a method of sealing a shallow or deep well at temperatures of less than about 250° F. with a compound that sets within about 3 to about 6 hours, comprising introducing into the well sufficient quantities of an aqueous slurry of: a) $Al_2O_3$ present in the range of from about 55 to about 57% by weight of the sealant, b) $Al(OH)_3$ present in the range of from about 3.5 to about 5% by weight of the sealant, c) $H_3PO_4$ present in the range of from about 15 to about 16% by weight of the sealant, d) boric acid or borax up to about 1.1% by weight of the sealant, and e) water present in the range of from about 23 to about 27% by weight of the sealant, the constituents of the slurry being adjusted for well temperature and pressure and the presence or absence of salt water and the desired setting time.

A final object of the present invention is to provide a premixed powder for an aqueous slurry of a sealant for an oil or gas well, the premixed powder comprising a) MgO present in the range of from about 12.3% to about 18% by weight of the premixed powder, b) $KH_2PO_4$ present in the range of from about 37% to about 34% by weight of said premixed powder, c) class C fly ash present in the range of from about 24.75% to about 45.3% of the premixed powder, d) class F fly ash present in the range of from about 24.75% to about 0% by weight of the premixed powder, and e) boric acid or borax present in the range of from about 0.48% to about 1.81% by weight of the premixed powder.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE PREFERRED EMBODIMENTS

CBPC binders are very important in the drilling and completions operations in oil and gas industry. In the entire history of oil and gas industry, the cementing job is done using conventional Portland based cement formulations. CBPCs are superior to Portland cements in many respects. Their formulations are precise and their behavior is predictable and their strength characteristics are superior to conventional cements. CBPC's bond to formation rocks and steel casings better than conventional cements and they are also self-bonding; they set well in saline and any other abnormal environment such as in the presence of hydrocarbons. Once set, they are not affected by carbon dioxide, carbon monoxide, and other organic gases.

Monopotassium phosphate is a naturally radioactive material. Thus, one of the formulations reported in this disclosure, is naturally radioactive. Its activity can help in detecting its proper placement using radioactive detectors as logs.

Generally, CBPCs are more expensive than conventional cements. However, even conventional cements used in oil field applications, once modified with silica flour etc, can become expensive. Thus in niche applications, the prices of both types of materials become comparable but CBPCs provide additional advantages. This is the motivation behind the disclosure of these specific CBPC formulations for applications to oilfield industry.

The use of CBPCs in stabilizing drilling wastes arises from the fact that CBPC binders may be used in a small proportion to bind large volumes of benign, hazardous, and radioactive oilfield drilling wastes to produce superior stabilized products. This disclosure takes full advantage of this observation.

There have been two earlier disclosures of CBPCs for oilfield applications, both for drilling and completion applications. The first one is disclosed in the patent application Ser. No. 09/510,663 filed 22 Feb. 2000, claiming priority of application Ser. No. 60/131,752 filed 30 Apr. 1999, entitled "Downhole Sealing Method and Composition", where general concept of use of CBPCs as oil field cement has been disclosed. This invention provides detailed formulations that were not disclosed in that invention. The second one is a patent granted to Halliburton Energy Services (U.S. Pat. No. 6,143,069) that disclosed calcium aluminate based CBPCs developed by Brookhaven National Laboratory for use in geothermal wells. The aluminum phosphate based formulation is much superior in its strength characteristics and hence is claimed here.

I. Oil and Gas Well Formulations

Depths of typical oil and gas wells range from 1000' to 22,000'. As the depth increases, the temperature and pressure also increase. In geothermal wells, the temperature can be higher than in oil wells. Table 1 provides typical profile of depth, temperature, and pressures in these wells, used in American Petroleum Institute (API) specifications.

TABLE 1

Depth, temperature, and pressures in oil and geothermal wells.

| Well type | Depth (feet) | Temperature (° F.) | Pressure (psi) |
| --- | --- | --- | --- |
| Shallow | 1000 | 80 | 700 |
| Shallow | 6500 | 120 | 3850 |
| Shallow and Deep | 9800 | 150 | 6150 |
| Deep | 13,300 | 200 | 9655 |
| Deep | 18,300 | 250 | 13285 |
| Deep | 21,750 | 300 | 16,640 |
| Geothermal | Any of the above | Can be > 300 | Any of the above |

We report different formulations for each type of wells in this disclosure. Thus, we discuss shallow well, deep well, and geothermal well formulations.

Because the formulations disclosed in this invention are relatively precise, the binder to be used for these formulations should also be well characterized. The following details provide specifications for the binder components.

Magnesium oxide (MgO): MgO should be well calcined at 1300° C. for three hours. The procedure to calcine is given in the earlier U.S. Pat. No. 6,204,214, the entire disclosure of which is incorporated by reference. Long term exposure of the powder to atmosphere should be avoided. Long term exposure leads to carbonation and hydration of the powder that changes its characteristics.

Monopotassium phosphate ($KH_2PO_4$): This should be 99 wt. % purity fine powder.

Class C ash: This should be fine powder not exposed to atmosphere over a long time. Long term exposure leads to carbonation.

Class F ash: This also should be fine powder not exposed to atmosphere over a long time. It should be free of excess calcium. Less than 4 wt. % of calcium is ideal.

Boric acid: Fine powder.

Aluminum hydroxide ($Al(OH)_3$): This should be amorphous powder, which shows mostly a large hump in the X-ray diffraction output.

Alumina ($Al_2O_3$): This should be calcined alumina free of hydroxide content and mostly crystalline corundum.

All the above powders should be of average 10 micro meter particle size. They should be dry and hence must be stored in air-tight containers. Especially if these powders are preblended, their shelf life decreases over time and hence should not be stored more than one year.

In addition, use of calcium hydrophosphate ($Ca(H_2PO_4)_2 \cdot H_2O$), in the form of common fertilizer called triple super phosphate (TSP), is also disclosed here for recycling drilling waste streams. There are no specific requirements on TSP, except that it should contain mostly of soluble calcium hydrophosphate.

I-2. Pumping and Placement Requirements

The sealant should exhibit several requirements to allow sufficient time of pumping into a well bore, its rise in the annulus between the formation and the casing and bonding to both. Generally, 3 to 6 hour pumping time is preferred. For offshore applications, the cement should also set in saline environment. Prior to setting, the viscosity of the slurry should be low enough that it can be easily pumped and will rise in the annulus. Low density slurries are needed for good rise in the annulus, while heavy slurries are needed for proper placement under water. Often high flexural strength is needed for applications of these materials at lateral junctures. The cements should set in presence of drilling fluids, oils, and greases.

The following case studies provide evidence of CBPCs complying to these requirements.

Case Study 1: Formulations for Shallow Wells

The power blend consisted of 100 g MgO, 300 g $KH_2PO_4$, and 200 g each of Class C and F ashes. Depending on depth, we added boric acid to control the setting reaction. The mixture of the powders was added to 205 ml of water and mixed in a Hobart mixer for 5 min and then the entire powders was poured in the consistometer slurry cup. The instrument was run according to American Petroleum Institute (API) specifications and thickening time was determined. Table 2 gives the depth of well, temperature and pressure, and thickening time. The thickening time was the time required for the slurry to thicken to 70 Bearden units (Bc) in the consistometer.

TABLE 2

Formulations and thickening times for shallow wells

| Temp. (° F.) | Pressure (psi) | Depth (feet) | Boric acid (g) | Setting time (h:m) |
|---|---|---|---|---|
| 80 | 700 | 1000 | 4 | 5:01 |
| 120 | 3850 | 6,500 | 8 | 3:22 |
| 120 | 3850 | 6,500 | 12 | 5:54 |
| 150 | 6160 | 9,800 | 16 | 2:58 |

Table 2 shows that 3-5 hour pumping time can be attained with the formulation by adjusting the level of boric acid. The test at 120° F. also teaches that the thickening time can be increased or decreased by changing the concentration of the boric acid.

Boric acid is effective only up to 150° F. and does not work at higher temperatures. For this reason, we have discovered formulations that set very slowly at high temperatures and then can be accelerated to attain a desired time. The next case study demonstrates this.

Case Study 2: Formulations for Deep Wells

All the formulations in this case were as in Case I, but Class F fly ash was eliminated and was replaced by Class C. In addition, we used sand to adjust the thickening time at 250° F. and decreased C ash content proportionately. The amount of water to be added was adjusted to obtain suitably thin slurry (i.e., to decrease initial Bc). Thus the depths, temperature, and pressure, and thickening time were as in Table 3.

TABLE 3

Formulations and thickening times for deep wells

| Depth (feet) | Temp (° F.) | Pressure (psi) | C-ash (g) | Sand (g) | $H_2O$ (ml) | Boric acid (g) | Thickening time (h:m) |
|---|---|---|---|---|---|---|---|
| 14,300 | 200 | 9655 | 400 | 00 | 205 | 12 | 5:00 |
| 18,300 | 250 | 13,285 | 400 | 00 | 225 | 12 | 3:50 |
| 18,300 | 250 | 13,285 | 360 | 40 | 225 | 12 | 4:25 |
| 21,750 | 300 | 16,650 | 400 | 00 | 225 | 12 | 3:15 |

Figure 1:
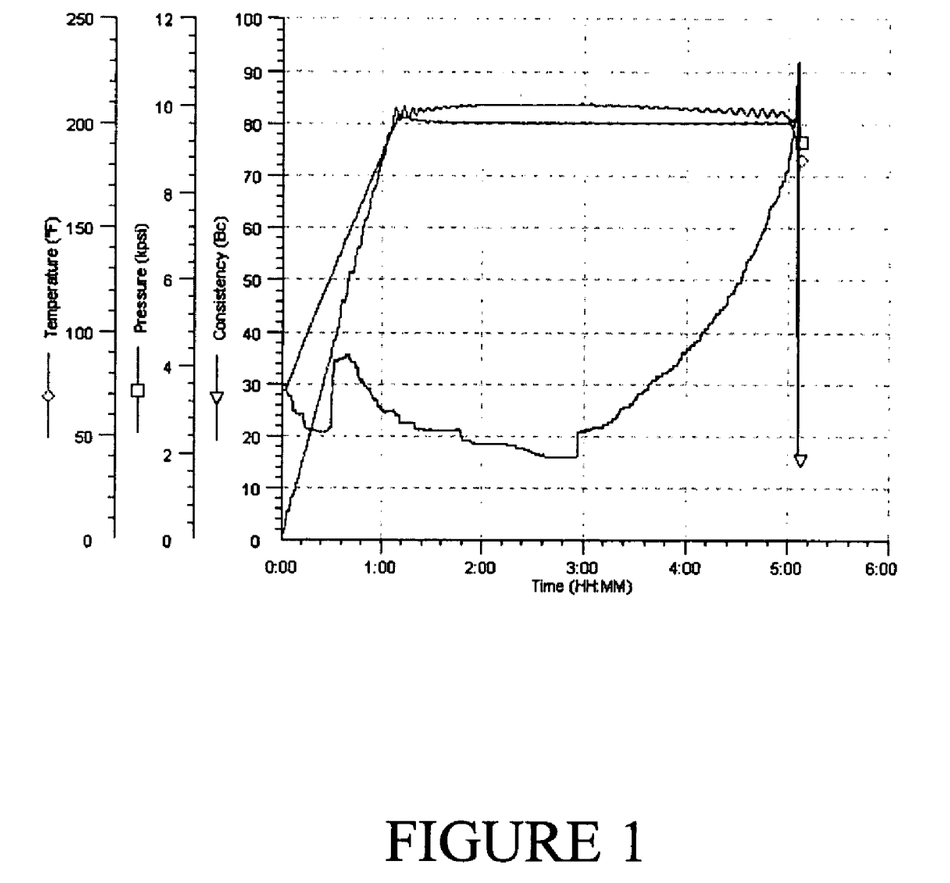
FIG. 1 is a graphical representation of the relationship of time, temperature and pressure for deep wells.
Figure 2:
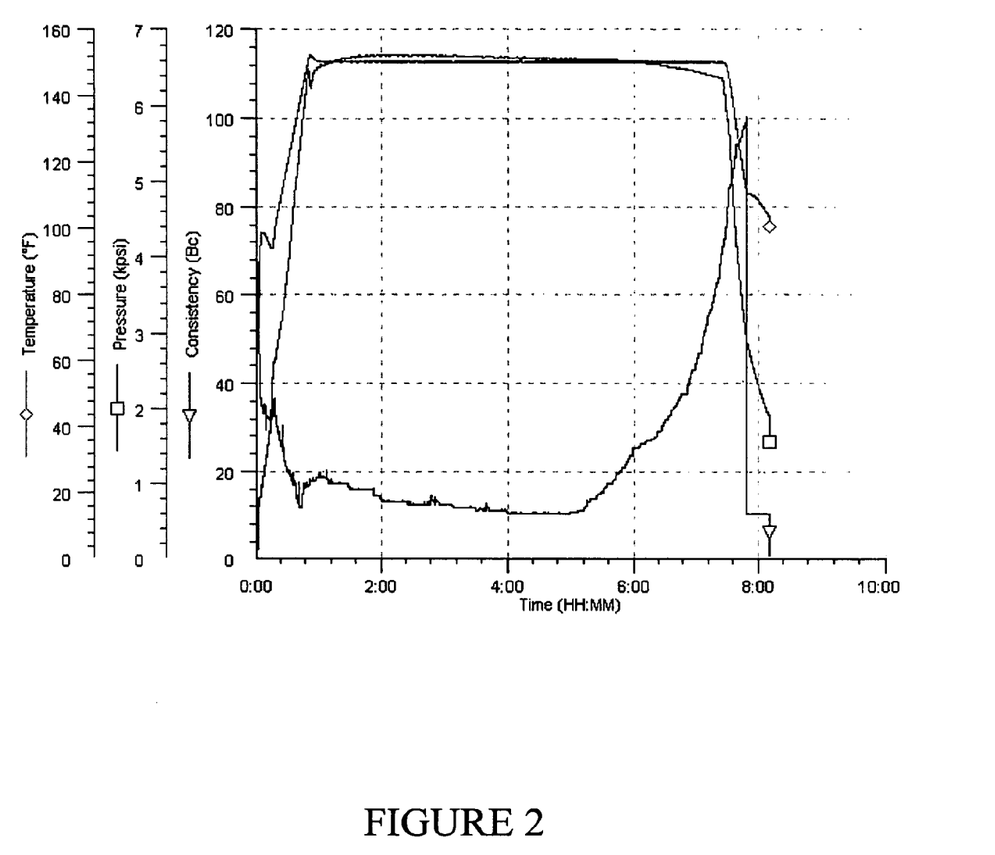
FIG. 2 is a graphical representation of the relationship of time, temperature and pressure for off-shore wells.

A typical time vs. consistency (Bc), temperature and pressure graph for deep wells is shown in FIG. 1.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

Case Study 3: Increasing and Decreasing Thickening Time

We have discovered that the thickening time can be decreased by increasing the content of MgO (i.e., ratio of $MgO:KH_2PO_4$) in both shallow and deep wells. At the same time, as mentioned before, boric acid increases the thickening time for shallow well formulations. Table 4 provides compositions used in these formulations.

TABLE 4

Formulations to adjust thickening time

| Depth (feet) | MgO (g) | C-ash (g) | F-ash (g) | Sand (g) | $H_2O$ (ml) | Boric acid (g) | Setting time (h:m) |
|---|---|---|---|---|---|---|---|
| 6,500 | 100 | 200 | 200 | 00 | 205 | 8 | 3:22 |
| 6,500 | 100 | 200 | 200 | 00 | 205 | 12 | 5:54 |
| 18,300 | 100 | 360 | 00 | 40 | 225 | 12 | 4:25 |
| 18,300 | 120 | 380 | 00 | 00 | 225 | 12 | 3:50 |
| 18,300 | 140 | 360 | 00 | 00 | 225 | 12 | 3:20 |
| 18,300 | 160 | 340 | 00 | 00 | 225 | 12 | 2:40 |

Case Study 4. Downhole Sealants with Saline Water for Off-Shore Applications.

To determine the thickening time of the formulations in off-shore applications, we simulated sea water according to formulation given in Table 5, and tested the thickening time. The formulations and the thickening time are given in Table 6.

TABLE 6

Composition of typical seawater

| Component | Amount |
|---|---|
| Deionized water | 5 liters |
| NaCl | 77.76 g |
| $MgCl_2$ | 10.88 g |
| $MgSO_4$ | 4.74 g |
| $CaSO_4$ | 3.6 g |
| $K_2SO_4$ | 2.46 g |
| $MgBr_2$ | 0.22 g |
| $CaCO_3$ | 0.34 g |

TABLE 7

Thickening time with simulated seawater

| Depth (feet) | MgO (g) | C-ash (g) | F-ash (g) | Saline $H_2O$ (ml) | Boric acid (g) | Setting time (h:m) |
|---|---|---|---|---|---|---|
| 1000 | 100 | 200 | 200 | 240 | 4 | >6 |
| 1000 | 120 | 200 | 200 | 250 | 4 | 5:50 |
| 9,800 | 100 | 200 | 200 | 205 | 16 | 7:00 |
| 18,300 | 120 | 380 | 00 | 225 | 12 | >6 |

As one may notice from Table 7, seawater retards the setting of the sealant. For shallow well formulations, it also needs more water. For example, for a well of 1000 feet, seawater formulation gives >6 hour thickening time, while the same with tap water is 5 h:01 min (see Table 1). The amount of tap water added was 205 ml, while we have to add 225 ml in the case of seawater. This may be partly because of slightly higher density of the seawater. One also notices a similar trend in deeper wells, i.e., at 9,800 and 18,300 feet for the setting time.

In a separate study, we have found that the saline water does not affect the integrity and strength of the set sample significantly. Therefore, the formulations given in Table 7 can be used for off-shore applications.

II. Light and Heavy Weight Cements

Modifying the formulation given in Tables 2-4, it is possible to develop sealants for various properties. For example, we can add Extendospheres (hollow silica spheres) and make lightweight sealants, or use heavy minerals such as haematite and magnetite and make heavy sealants. The following case study demonstrates discovery of lightweight sealant.

Case Study 5. Chemically Bonded Lightweight Sealants

Extendospheres® are hollow silica spheres of few hundred micron size. In this study we used Extendospheres supplied by PQ Corporation. The particular spheres we used were SG Extendospheres.

In one experiment, we added 33 wt. % Extendospheres, 17.5 wt. % binder composition, 17,5 wt. % C ash and formed the powder mixture. We formed the slurry by mixing the powder composition and water in the ratio 2:1. The slurry was mixed for 25 min by hand and allowed it to set. The mixture set into a solid but fragile product. Its density was only 0.5 g/cm$^3$.

The same mixture was attempted in a consistometer with a small amount of boric acid. The slurry was so light that it could not be tested, because when set, the slurry itself started spinning with the paddle and paddles did not experience any shear forces and hence no reading was obtained.

Table 8 shows the compositions with smaller amount of Extendospheres that could be tested in the consistometer.

TABLE 8

Composition of lighter sealant using consistometer

| MgO (g) | KH2PO4 (g) | C/F-ash (g) | Extendospheres/boric acid (g) | Water (ml) | Temperature (° F.) | Thickening time (h:m) |
|---|---|---|---|---|---|---|
| 120 | 300 | C, 340 | 40 | Sea water 225 | 250 | 4:35 |
| 100 | 300 | C, F, 180 each | 40 | Seawater 225 | 150 | 1:45 |
| 100 | 300 | C, F, 180 each | 40, boric acid 4 | Seawater 250 | 80 | 4:00 |

Strength, and Bonding of the phosphate sealants with steel and downhole rocks:

For successful applications of these sealants, their compressive strength should be good and their bonding characteristics with downhole rocks and the casing material should be excellent. To test these following investigations were carried out.

Case Study 6. Compressive Strength of the Sealant Compositions

The composition given in Table 3 for deep wells was used for this study. No boric acid was added so that the slurry thickens sufficiently fast. When mixed by hand for an hour, it was very thick and warm. It was then poured in ASTM standard plastic cylindrical molds of 2" diameter and 4" length. The molds were then placed in a bigger plastic closed bottle that was filled with warm water fully. The whole arrangement was placed in a big water bath, whose temperature was maintained at 170° F. (a typical downhole temperature). The sample was cured overnight and was taken out next day. It was already hard. It was then dried in air for next two days and its compression strength was measured using an Instron machine in a compressive mode. The compressive strengths measured on three samples made and cured this way were 2197, 1993, and 1958 psi respectively. The average of these three data points is 2049 psi.

In several cases, the slurry taken out of the consistometer with a Bc <70 was placed in a hot water tub (170° F.) overnight. It did not set well next day. Also, slurry with Bc >70 did not set in ambient temperature. This implies that deep well compositions need the downhole temperature to set. For this reason, all samples prepared for strength measurements were cured in hot water environment.

We believe these strengths could be higher if the samples are cured for longer time, as our earlier studies have shown that strength keeps rising for at least 45 days.

Case Study 7. Shear Bond Strength with Downhole Rocks

Cylindrical specimens of three different downhole rocks were provided by Exxon-Mobil. They were sandstone, limestone, and dolomite. All were cylindrical with diameter between 1.401" to 1.517". The length of each specimen was at least 4".

Each specimen was cut at the center at an angle 45° to its length. It was then placed in a metal cylinder of nearly the same inner diameter. The cylinder was lined inside with a plastic sheet. Slurry of the sealant was made using the same procedure used for compression strength measurements. It was poured in each of the cylinder such that it forms a complimentary cylinder at the slanted surface of the rock. The whole arrangement was placed in a closed bottle as before filled with warm water. The bottle was then placed in the water bath maintained at 170° F. The assembly of slurry and the rock was allowed to set overnight and was taken out of the mold next day. It was dried for two days and then the shear bond strength between the rock and the set slurry was measured in a compressive mode.

This test was conducted for both shallow and deep well formulations. The results are given below.

TABLE 9

Shear bond strengths between downhole rocks and sealants

| Rock type | Sealant type | Shear bond strength (psi) | Comments |
|---|---|---|---|
| Sandstone | Shallow well | 4693 | The shear bond strength is sufficiently high. |
|  | Deep well | 2492 |  |
| Limestone | Shallow well | 1931 | In both cases, the rock was crushed and the bond was unaffected. This implies that shear bond strength is > compressive strength of limestone. |
|  | Deep well | 4619 |  |
| Dolomite | Shallow well | 448 | The shear bond strength is poor. |
|  | Deep well | 232 |  |

The results shown in Table 9 are on one specimen each. The number of specimens was not sufficient for multiple tests.

As one may notice from Table 9, the bond strength between sandstone and the sealant and also between limestone and the sealant is high, while the same between the dolomite and the sealant is poor. In the case of limestone, the stone itself was crushed under the compressive load and hence the actual bond strength could not be measured, but one may conclude that the bond strength is at least as much as that of the compressive strength of the stone itself.

The high strength between the sandstone and limestone with the sealant appears to be both chemical as well as physical. Because these rocks contain calcium oxide in sufficiently large quantity, reaction occurs between the acid-phosphate from the binder and calcium oxide. This leads to the chemical bonds. The physical bond occurs because, the rocks may be porous and the sealant enters the pours on the interface and adheres to the rock. Alternatively, the rock interface is also rough and hence the slurry fills the surface texture and provides the necessary physical bond.

In the case of dolomite, the sealant part simply separated from the rock at the 45° surface indicating there was neither a chemical nor a physical bond. Dolomite samples were very dense and their surface was very smooth. When the specimen and the sealant debonded, the surface of dolomite specimen was clean and there was no sign of any chemical corrosion or physical adhesion of the sealant. Both of these mechanisms of bonding seem to be absent. More study is needed on the chemical composition of the shale provided to determine absence of chemical reaction between the rock and the sealant.

Case Study 8. Shear Bond Strength with Mild Steel

Mild steel API 5L was used for this study. A pipe of internal diameter 1.63" was cut into several sections, each of 1" length. Three specimens were filled with the sealant slurry of deep well formulation and three with shallow well formulation. One of each specimen was cured in hot water as described above and two of each at ambient temperature.

After curing for four days, specimens from water were taken out and cured in air along with the other air cured samples. After three days of drying in air, they were subject to the bond strength test. In this test, one empty cylinder was placed coaxially below the specimen and the set sealant was pushed in a compressive mode using an Instron machine. In all the cases, the sealant could not be pushed out. The load cell of the machine reached to its limits and the machine started vibrating. The actual maximum forces applied are given in Table 9.

TABLE 10

Compressive loads applied to steel-sealant specimens

| Sealant type | Curing environment | Compressive load (lbs) | Comments |
|---|---|---|---|
| Deep well | Air | 3078 | Sealant crushed inside due to voids inside. Bond was intact. |
| | Air | 7648 | Bond was intact. |
| | Water | 10430 | Bond was intact. |
| Shallow well | Air | 8024 | Bond was intact. |
| | Air | 10040 | Bond was intact. |
| | Water | 3858 | Sealant crushed inside. Bond was intact. |

As one may see from the comments in Table 9, the bond between steel wall and the sealant inside was intact and we could not dislodge the sealant from the pipe. In two cases (first and last specimen), there must have been some voids in the specimen. As a result, the material slightly crushed inside. The test was not continued because the entire machine started vibrating with a noise.

In any case, this test indicates that the bond between a casing and the sealant was excellent.

Case Study 9: Novel Formulations for Geothermal and Very Hot Wells

We have invented novel phosphate binders for applications in wells that have temperatures >=300° F. They are based on the theoretical formulation given below.

Using thermodynamics of dissolution of oxides (and oxide minerals), insoluble oxides exhibit a temperature of maximum solubility, where the dissolution is maximum and decreases as the temperature and pressure regimes are either increased or decreased. Especially the temperature effect is more pronounced in these cases. This temperature of maximum solubility ($T_{max}$) is given by $$T_{max} = T_0 - \Delta H(T_0)/\Delta C_p, \quad (1)$$

where, $H(T_0)$ and $\Delta C_p$ are the net change in the enthalpy and heat capacity that occurs during the solubilization of a particular oxide or a mineral. If $T_{max}$ is the same as the temperature of the deep well, then that oxide or mineral may be used for formation of phosphate cement. We have listed these temperatures for several aluminum oxides and other minerals in Table 11.

TABLE 11

Maximum solubility temperatures for various oxides and oxide minerals

| Oxide or mineral | $T_{max}$ (° F.) | Method of determination |
|---|---|---|
| Hydrated alumina, Al(OH)$_3$ | 270 | Theoretical |
| Corundum, Al$_2$O$_3$ | 223 | Theoretical |
| Gibbsite, Al$_2$O$_3$•3H$_2$O | 338 | Theoretical |
| Boehmite, Al$_2$O$_3$•H$_2$O | 266 | Theoretical |
| Wollastonite, CaSiO$_3$ | 160 | Theoretical |
| C-fly ash | 180 | Experimental |

Table 11 shows the temperatures of maximum solubility of different oxides. As one may notice from the Table, wollastonite and C-ash are most suitable for wells up to 300° F. while corundum, hydrated alumina, and boehmite are suitable for hotter wells, i.e., geothermal wells of the corresponding temperatures. In this invention, we have used these considerations and tested some of these minerals as downhole cements.

Alumina, when reacted with phosphoric acid solution forms aluminum phosphate called berlinite (AlPO$_4$). The maximum dissolution of alumina, as discussed in the previous section occurs according to formula $$Al_2O_3 + 3H_2O = 2Al^{+++}(aq) + 6(OH^-) \quad (1)$$

Same time phosphoric acid also ionizes according to the relation, $$H_3PO_4 = H^+ + H_2PO_4^- \quad (2)$$

When Equations (1) and (2) are combined, we obtained $$Al_2O_3 = 2AlPO_4 + 3H_2O \quad (3)$$

Experimentally, was found that the last reaction (Eq. 3) occurs at 150° C. or 302° F. and use of corundum alone gives a very long thickening time.

We have discovered that a small amount of hydrated alumina accelerates the setting time and gives reasonable thickening time. Table 12 demonstrates this. At 250° F., addition of 64 g of hydrated alumina in 800 g of corundum gives a thickening time of 1 h: 10 m. This time can be increased by adding boric acid, which retards the slurry at lower temperatures and provides 3 h:20 min.

TABLE 12

Thickening time tests with alumina binders

| Temperature (° F.) | $Al_2O_3$ | $Al(OH)_3$ | $H_3PO_4$ | Boric acid | $H_2O$ | Thickening time (h:m) |
|---|---|---|---|---|---|---|
| 250 | 800 | 64 | 221 | 0 | 331 | 1:10 |
| 250 | 800 | 64 | 221 | 8 | 331 | 2:10 |
| 250 | 800 | 64 | 221 | 12 | 331 | 3:20 |
| 300 | 800 | 64 | 221 | 12 | 331 | 1:30 |
| 300 | 800 | 64 | 221 | 16 | 331 | 1:30 |
| 300 | 800 | 56 | 221 | 12 | 331 | 2:35 |
| 300 | 800 | 52 | 221 | 16 | 331 | >6 |

There is hardly any effect of increase in boric acid content at 300° F., even though a minimum amount of boric acid is needed to avoid flash setting at low temperatures because of amorphous hydrated alumina. At this temperature, reduction in the concentration of hydrated alumina increases the thickening time. This may be seen from the last four rows in Table 12.

Overall the data in Table 12 shows that the alumina based ceramic is well suited well for geothermal wells where temperature is high.

Figure 3:
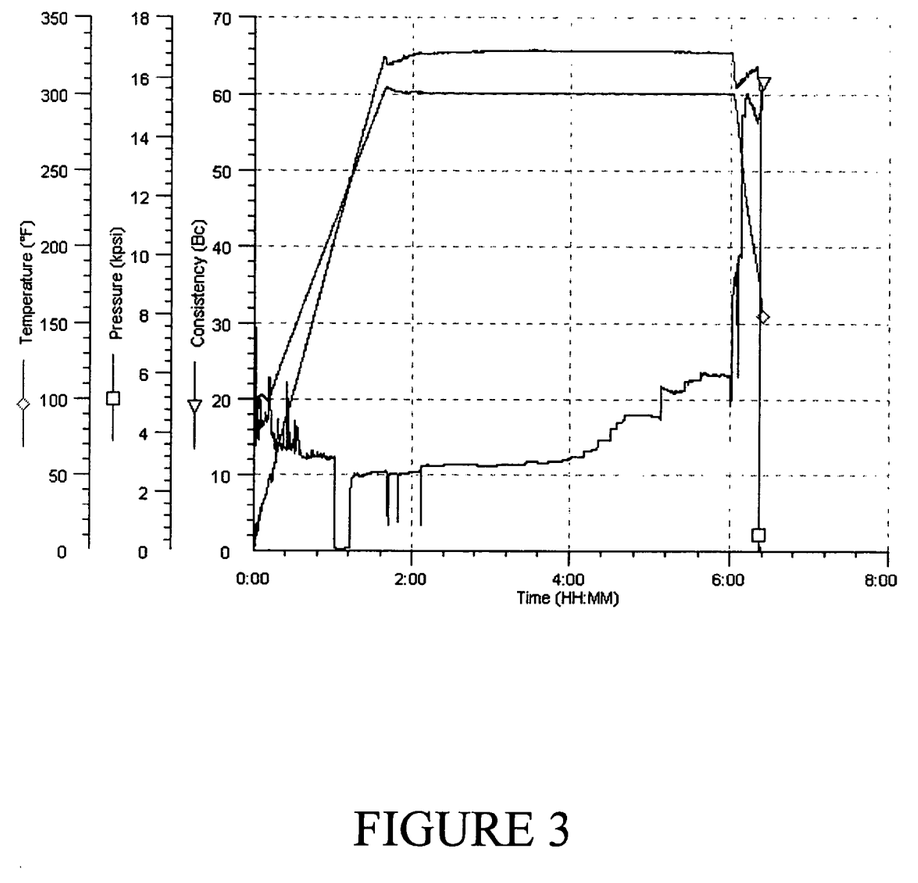
FIG. 3 is a graphical representation of the relationship of typical time and Bc for wells at 300° F. for aluminum phosphate sealant.

A typical time vs. consistency (Bc), temperature, and pressure graph for aluminum phosphate sealants is shown in FIG. 3.

Case Study 10: Fast Setting Injectable Cements

One of the advantages of the aluminum phosphate sealants is that when alumina is mixed in phosphoric acid solution at room temperature, it forms very smooth slurry that can be sprayed through very thin nozzles. If we mix a small amount of MgO to this, it flash sets. This has an application in spraying technology.

For coating steel for example with phosphate cements to make them fire resistant, such a spraying mechanism is needed. It should be done with a double nozzle, in which the slurry formed by dissolving alumina in phosphoric acid solution comes from one nozzle and MgO slurry in water comes from the other. They mix at the tip and the mixture is sprayed on the surface where it reacts immediately and hardens on the surface.

To test this we prepared alumina slurry in 50 wt. % phosphoric acid solution. The ratio of the acid solution to alumina was 8:5. The mixture was put on roller to mix overnight, which formed smooth, thin slurry with very low viscosity. Next day, we added a small amount of MgO to this and the entire mixture set into a solid within minutes.

III. Use of CBPCs for Treatment of Oil Field Waste Streams

Oilfield wastes such as drilling wastes may be grouped into three categories.

Radioactive NORM wastes: These are naturally occurring radioactive materials (NORM). Due to their radioactivity, environmental regulatory compliance is needed in disposing these waste streams.

Hazardous wastes: These waste streams are chemically hazardous and contain metals and organics that are controlled by the EPA's Regulatory Compliance and Recovery Act (RCRA). Under this act, these waste streams need to be suitably stabilized prior to disposal.

Benign high volume wastes: These are neither radioactive nor hazardous, but due to their shear volume are a nuisance and hence need suitable recycling or disposal.

CBPCs provide methods to treat these waste streams for suitable disposal or for recycling. The following candidate systems that may be used as binders for these applications.

Magnesium potassium phosphate binder (Ceramicrete),
Calcium phosphate binder using triple super phosphate (TSP),
Iron phosphate ceramics (Ferroceramicrete).
Aluminum phosphate binder (Alucrete)

Ample demonstrations of Ceramicrete binder for stabilization of hazardous and radioactive waste streams has been carried out and published. In several occasions, we have also demonstrated use of Ceramicrete and Ferroceramicrete binders in recycling benign waste streams. The most important application that would be very economical to the oil industry is recycling these waste streams as components of downhole cements. In the formulations of oil well cements given above, it is possible to replace some of the ash by the waste streams that include, NORM, hazardous, and benign waste streams, including spent drilling mud and other waste streams, all collectively termed oilfield waste, herein Recycling these waste streams right in the field helps the production and service industry in following ways.

It saves the industry high cost of transport of the waste and its disposal.

It saves the industry transport of fillers such as ash to the site to produce downhole cement.

Use of TSP for forming value-added products with benign wastes has a tremendous advantage. The product can be as cheap as that with cement and hence can be affordable even in a third world country. In this project, we demonstrate this by using some of the benign waste streams from oil fields.

One of the requirements that need to be met for these applications is that most of these waste streams contain organics such as oils and greases. Effective stabilization of such wastes should occur in presence of oils and greases. The following case study demonstrates that drilling cements can be developed with streams containing oils.

Case Study 11: Effect of Mineral Oils on Oil Well Cements

In this case study, we added mineral oil to some of the formulations of borehole sealants given above and studied their thickening time. Several tests were conducted. In each test, we added 12 to 15 g of mineral oil to 800 g of powder and 12 g of boric acid. The consistometer tests were run as before. We found that mineral oil did not drastically change the thickening time. The consistency increased smoothly and when the slurry cup was taken out from the consistometer, the oil had stayed on top separating from the slurry. The slurry set eventually.

This case study demonstrates that mineral oil does not affect the setting and hence drill cuttings can be used as fillers to produce drilling cements.

While particular embodiments of the present invention have been shown and described, it will be appreciated by those skilled in the art that changes and modifications may be made without departing from the invention in its broader aspects.

Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiment of the invention in which an exclusive property or privilege is claimed are defined as follows:

1. A sealant for an oil or geothermal well capable of setting within about 3 to about 6 hours at temperatures less than about 250° F. for shallow wells less than about 10,000 feet and deep wells greater than about 10,000 feet, said sealant being comprised of:
   a) MgO present in the range of from about 9.9 to about 14.5% by weight of said sealant,
   b) $KH_2PO_4$ present in the range of from about 29.7 to about 27.2% by weight of said sealant,
   c) class C fly ash present in the range of from about 19.8 to about 36.3% by weight of said sealant,
   d) class F fly ash present in the range of from about 19.8 to about 0% by weight of said sealant,
   e) boric acid or borax present in the range of from about 0.39 to about 1.45% by weight of said sealant, and
   f) water present in the range of from about 20.3 to about 21.86% by weight of said sealant.

2. The sealant of claim 1, wherein said MgO is present at about 10% and said $KH_2PO_4$ is present at about 30% and said class C fly ash is present at about 20% and said class F fly ash is present at about 20% and said boric acid or borax is present at about 0.4% and fresh water if present is at about 20% and salt water if present is at about 22% of said sealant, said sealant being adapted for shallow wells less than about 10,000 feet and at temperatures of less than about 150° F.

3. The sealant of claim 1, wherein said MgO is present at about 10% and said $KH_2PO_4$ is present at about 30% and said class C fly ash is present at about 40% and said class F fly ash is substantially absent and said boric acid or borax is present at about 0.4% and fresh water if present is at about 20% and salt water if present is at about 22% of said sealant, said sealant being adapted for deep wells greater than about 10,000 feet.

4. The sealant of claim 3, wherein at least some wollastonite is substituted for class C fly ash.

5. The sealant of claim 1, wherein at least some sand is substituted for class C fly ash to adjust setting times.

6. The sealant of claim 1 and further comprising lightweight or heavyweight material added to said slurry to vary the density of said slurry from about 0.5 $g/cm^3$ to about 1.8 $g/cm^3$.

7. The sealant of claim 6, wherein said lightweight material is a plurality of hollow silica spheres.

8. The sealant of claim 6, wherein said heavyweight material is a mineral such as haematite or magnetite or an equivalent thereof.

9. The sealant of claim 1, wherein said MgO is calcined at a temperature not less than about 1300° C. for not less than about 3 hours.

10. The sealant of claim 1, wherein class F fly ash is substantially free of excess calcium.

11. The sealant of claim 1, wherein the sealant constituents other than water are powders having average sizes of about 10 microns.

12. A premixed powder for aqueous slurry of a sealant for an oil or gas well, said premixed powder comprising
   a) MgO present in the range of from about 12.3% to about 18% by weight of said premixed powder,
   b) $KH_2PO_4$ present in the range of from about 37% to about 34% by weight of said premixed powder,
   c) class C fly ash present in the range of from about 24.75% to about 45.3% of said premixed powder,
   d) class F fly ash present in the range of from about 24.75% to about 0% by weight of said premixed powder, and
   e) boric acid or borax present in the range of from 0.48 to about 1.81% by weight of said premixed powder.

13. The premixed powder of claim 12, wherein at least some wollastonite is substituted for class C fly ash.

14. The sealant of claim 12, wherein at least some sand is substituted for class C fly ash to adjust setting times.

15. The sealant of claim 12 and further comprising lightweight or heavyweight material added to said slurry to vary the density of said slurry from about 0.5 $g/cm^3$ to about 1.8 $g/cm^3$.

16. The premixed powder of claim 12, wherein the sealant constituents other than water are powders having average sizes of about 10 microns.

* * * * *